US009608993B1

(12) United States Patent
Camenisch et al.

(10) Patent No.: US 9,608,993 B1
(45) Date of Patent: Mar. 28, 2017

(54) CREDENTIAL ABUSE PREVENTION AND EFFICIENT REVOCATION WITH OBLIVIOUS THIRD PARTY

(71) Applicant: International Business Machines Corporation, Armonk, NY (US)

(72) Inventors: Jan L. Camenisch, Thalwil (CH); Maria Dubovitskaya, Zuricfh (CH); Gregory Neven, Oberrieden (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/012,356

(22) Filed: Feb. 1, 2016

(51) Int. Cl.
H04L 29/06 (2006.01)

(52) U.S. Cl.
CPC .............. *H04L 63/10* (2013.01); *H04L 63/12* (2013.01); *H04L 63/20* (2013.01)

(58) Field of Classification Search
CPC .......... H04L 63/10; H04L 63/12; H04L 63/20
See application file for complete search history.

(56) References Cited

U.S. PATENT DOCUMENTS

| 8,302,149 | B2 | 10/2012 | Della-Libera et al. | |
|---|---|---|---|---|
| 8,738,539 | B2* | 5/2014 | Al-Herz | H04L 9/321 705/24 |
| 2004/0098352 | A1* | 5/2004 | Matsuyama | G06Q 20/04 705/71 |
| 2008/0229384 | A1* | 9/2008 | Hodgkinson | G06F 21/41 726/1 |
| 2015/0081566 | A1* | 3/2015 | Slepinin | G06Q 20/3829 705/69 |

FOREIGN PATENT DOCUMENTS

| CA | 2816989 A1 | 5/2012 |
|---|---|---|
| WO | 2012060979 A1 | 5/2012 |

OTHER PUBLICATIONS

Shields et al., Canadian Patent Application CA 2319919 to Twin Lion Systems Inc., Canadian Intellectual Property Office, Mar. 15, 2002, 46 pages.*

(Continued)

*Primary Examiner* — Ellen Tran
(74) *Attorney, Agent, or Firm* — Cantor Colburn LLP; David Quinn

(57) ABSTRACT

Aspects relate to a computer implemented anonymous credential method for credential abuse prevention and efficient revocation. The method includes acquiring a credential from an issuer at a user, registering the user and credential with an oblivious monitor, generating a user presentation token at the user using the credential, requesting presentation with the oblivious monitor by the user, wherein the user presentation token is transmitted to the oblivious monitor, verifying the user presentation token, wherein presentation is aborted if verification fails, transmitting, from the oblivious monitor, an oblivious monitor presentation token portion to the user in response to the verification passing, transmitting a combined presentation token to a verifier, wherein the combined presentation token includes the user presentation token and the oblivious monitor presentation token portion, and verifying the combined presentation token at the verifier.

20 Claims, 7 Drawing Sheets

(56) References Cited

OTHER PUBLICATIONS

E. Brickell, et al., "Direct Anonymous Attestation", ACM, Oct. 25-29, 2004, p. 1-14.
J. Camenisch, et al., "Compact E-Cash", Computer Science Department, Brown University, May 9, 2006, p. 1-35.
J. Camenisch, et al., "Concepts and Languages for Privacy-Preserving Attribute-Based Authentication", IBM Research, Microsoft Research, p. 1-25.
J. Camenisch, et al., "Signature Schemes and Anonymous Credentials from Bilinear Maps", International Association for Cryptologic Research, 2004, p. 1-17.

* cited by examiner

CREDENTIAL ABUSE PREVENTION AND EFFICIENT REVOCATION WITH OBLIVIOUS THIRD PARTY

BACKGROUND

The present disclosure relates generally to credential abuse prevention and, more specifically, to a method and system for credential abuse prevention and efficient revocation.

Attribute-based anonymous credentials can be a powerful instrument for privacy-preserving authentication. However, privacy features such as anonymity and unlinkability prevent service providers from knowing if the credentials are in the hands of a legitimate user or not. The verifier cannot tell if two presentations were done by the same user or not without being able to track them.

Accordingly, in an attempt to lessen the risk of illegitimate use, device binding mechanisms such as direct anonymous attestation (DAA) scheme can be implemented to help by preventing users from using their credentials without the device where the secret is embedded. However, the software-based credentials that are stored in a cloud web-based or a mobile credential wallet can be copied and used by the other users. Furthermore, if the device is stolen or shared between the users, the number of presentations that are done with the misused credentials are not limited. Anonymous e-cash systems provide mechanisms that try to help by preventing over-spending of credentials, but do not consider the timing and sharing of the credentials.

Therefore, if the wallet is stolen or credentials are being shared among malicious users there is no mechanism in place that prevents the credentials misuse while still preserving users' anonymity and unlinkability.

SUMMARY

According to embodiments, a method, system, and computer program product are provided for credential abuse prevention and efficient revocation.

In accordance with an embodiment, a computer implemented anonymous credential method for credential abuse prevention and efficient revocation is provided. The method includes acquiring a credential from an issuer at a user, registering the user and credential with an oblivious monitor, generating a user presentation token at the user using the credential, requesting presentation with the oblivious monitor by the user, wherein the user presentation token is transmitted to the oblivious monitor, verifying the user presentation token, wherein presentation is aborted if verification fails, transmitting, from the oblivious monitor, an oblivious monitor presentation token portion to the user in response to the verification passing, transmitting a combined presentation token to a verifier, wherein the combined presentation token includes the user presentation token and the oblivious monitor presentation token portion, and verifying the combined presentation token at the verifier.

In accordance with another embodiment, a messaging system includes an anonymous credential system for credential abuse prevention and efficient revocation. The system includes one or more memory devices having computer readable instructions, and one or more processors for executing the computer readable instructions. The computer readable instructions includes acquiring a credential from an issuer at a user, registering the user and credential with an oblivious monitor, generating a user presentation token at the user using the credential, requesting presentation with the oblivious monitor by the user, wherein the user presentation token is transmitted to the oblivious monitor, verifying the user presentation token, wherein presentation is aborted if verification fails, transmitting, from the oblivious monitor, an oblivious monitor presentation token portion to the user in response to the verification passing, transmitting a combined presentation token to a verifier, wherein the combined presentation token includes the user presentation token and the oblivious monitor presentation token portion, and verifying the combined presentation token at the verifier.

In accordance with a further embodiment a computer program product for credential abuse prevention and efficient revocation is provided. The computer program product includes a computer readable storage medium having program instructions embodied therewith. The program instructions executable by a processor to cause the processor to acquire a credential from an issuer at a user, register the user and credential with an oblivious monitor, generate a user presentation token at the user using the credential, request presentation with the oblivious monitor by the user, wherein the user presentation token is transmitted to the oblivious monitor, verify the user presentation token, wherein presentation is aborted if verification fails, transmit, from the oblivious monitor, an oblivious monitor presentation token portion to the user in response to the verification passing, transmit a combined presentation token to a verifier, wherein the combined presentation token comprises the user presentation token and the oblivious monitor presentation token portion, and verify the combined presentation token at the verifier.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The forgoing and other features, and advantages of the invention are apparent from the following detailed description taken in conjunction with the accompanying drawings in which.

DETAILED DESCRIPTION

It is understood in advance that although this disclosure includes a detailed description on a single computer system, implementation of the teachings recited herein are not limited to a computer system and environment. Rather, embodiments of the present invention are capable of being implemented in conjunction with any other type of computing environment now known or later developed such as systems that include multiple computers or clusters of systems.

An attribute-based anonymous credential, in accordance with one or more embodiments, can be a powerful instrument for privacy-preserving authentication. An anonymous credential system comprises one or more users, issuers, and verifiers. An issuer certifies a user's attributes in the form of a digital certificate, called credential. A user stores her credentials in a digital wallet. To authenticate a user, a service provider sends a presentation policy to the user, who lets her wallet accordingly derive a presentation token from her credentials and sends it to the service provider. The service provider, acting as verifier, then verifies whether the token is valid with respect to the originally sent policy. Privacy features such as anonymity and unlinkability prevent service providers from knowing if the credentials are in the hands of a legitimate user or not. The verifier cannot tell if two presentations were done by the same user or not without being able to track them.

Accordingly, embodiments described herein are directed to an anonymous credential system where credential usage is controlled by a third party—an oblivious monitor (OM) that restricts credential spending and prevents usage of the revoked credentials. According to one or more embodiments, an oblivious monitor is oblivious in that the monitor does not know which user it is, and all presentation tokens are unlinkable.

Figure 1:
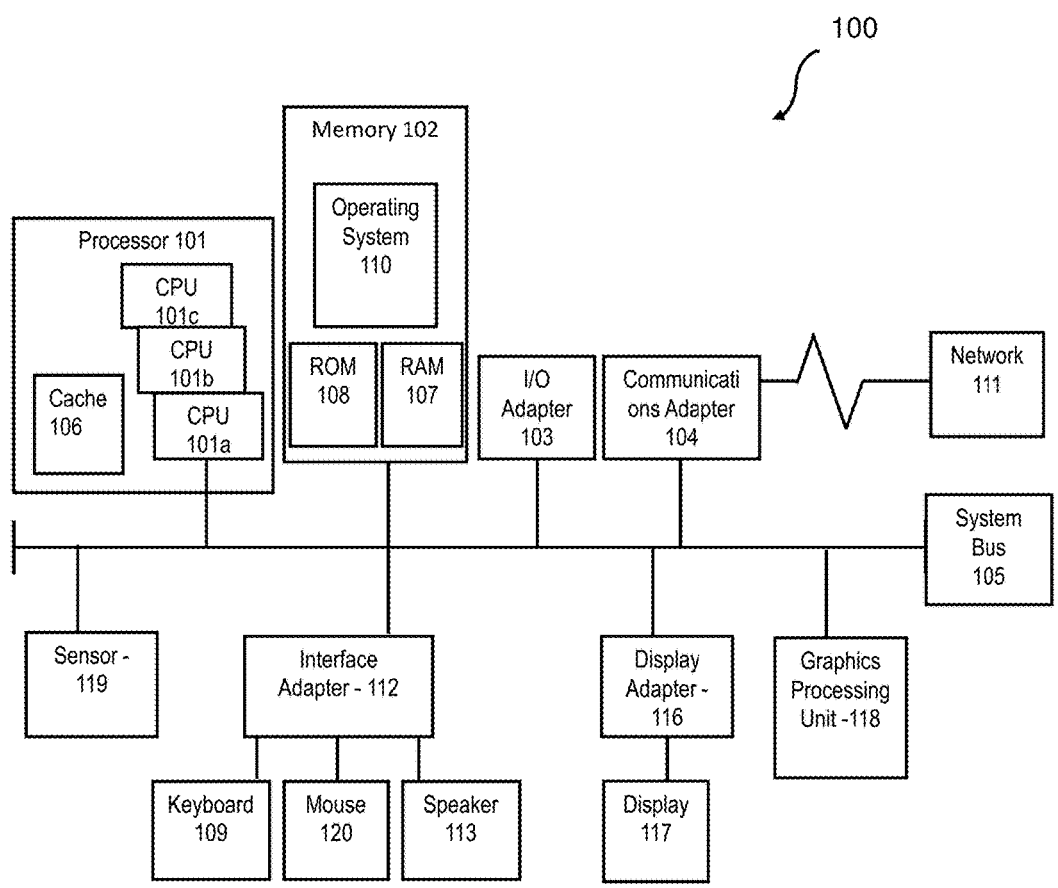
FIG. 1 depicts a block diagram of a computer system for implementing some or all aspects of the system, according to some embodiments of this disclosure.

Turning now to FIG. 1, an electronic computing device 100, which may also be called a computer system 100 which may be part of or itself be a user, issuer, verifier, revocation authority, or oblivious monitor, is generally shown in accordance with one or more embodiments. Further, the computer system includes a plurality of electronic computing device sub-components, any one of which may be part of or themselves be a user, issuer, verifier, revocation authority, or oblivious monitor. Particularly, FIG. 1 illustrates a block diagram of a computer system 100 (hereafter "computer 100") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 100 therefore can embody a general-purpose computer. In another exemplary embodiment, the methods described herein are implemented as part of a mobile device, such as, for example, a mobile phone, a personal data assistant (PDA), a tablet computer, a wearable electronic, etc.

In an exemplary embodiment, in terms of hardware architecture, as shown in FIG. 1, the computer 100 includes processor 101. Computer 100 also includes memory 102 coupled to processor 101, and one or more input and/or output (I/O) adaptors 103, that may be communicatively coupled via a local system bus 105. Communications adaptor 104 may be operatively connect computer 100 to one or more networks 111. System bus 105 may also connect one or more user interfaces via interface adaptor 112. Interface adaptor 112 may connect a plurality of user interfaces to computer 100 including, for example, keyboard 109, mouse 120, speaker 113, etc. System bus 105 may also connect display adaptor 116 and display 117 to processor 101. Processor 101 may also be operatively connected to graphical processing unit 118.

Further, the computer 100 may also include a sensor 119 that is operatively connected to one or more of the other electronic sub-components of the computer 100 through the system bus 105. The sensor 119 can be an integrated or a standalone sensor that is separate from the computer 100 and may be communicatively connected using a wire or may communicate with the computer 100 using wireless transmissions.

Processor 101 is a hardware device for executing hardware instructions or software, particularly that stored in a non-transitory computer-readable memory (e.g., memory 102). Processor 101 can be any custom made or commercially available processor, a central processing unit (CPU), a plurality of CPUs, for example, CPU 101a-101c, an auxiliary processor among several other processors associated with the computer 100, a semiconductor based microprocessor (in the form of a microchip or chip set), a macroprocessor, or generally any device for executing instructions. Processor 101 can include a memory cache 106, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 106 may be organized as a hierarchy of more cache levels (L1, L2, etc.).

Memory 102 can include random access memory (RAM) 107 and read only memory (ROM) 108. RAM 107 can be any one or combination of volatile memory elements (e.g., DRAM, SRAM, SDRAM, etc.). ROM 108 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Note that the memory 102 can have a distributed architecture, where various components are situated remote from one another, but can be accessed by the processor 101.

The instructions in memory 102 may include one or more separate programs, each of which comprises an ordered listing of computer-executable instructions for implementing logical functions. In the example of FIG. 1, the instructions in memory 102 may include a suitable operating system 110. Operating system 110 can control the execution of other computer programs and provides scheduling, input-output control, file and data management, memory management, and communication control and related services.

Input/output adaptor 103 can be, for example but not limited to, one or more buses or other wired or wireless connections, as is known in the art. The input/output adaptor 103 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Interface adaptor 112 may be configured to operatively connect one or more I/O devices to computer 100. For example, interface adaptor 112 may connect a conventional keyboard 109 and mouse 120. Other output devices, e.g., speaker 113 may be operatively connected to interface adaptor 112. Other output devices may also be included, although not shown. For example, devices may include but are not limited to a printer, a scanner, microphone, and/or the like. Finally, the I/O devices connectable to interface adaptor 112 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

Computer 100 can further include display adaptor 116 coupled to one or more displays 117. In an exemplary embodiment, computer 100 can further include communications adaptor 104 for coupling to a network 111.

Network 111 can be an IP-based network for communication between computer 100 and any external device. Network 111 transmits and receives data between computer 100 and external systems. In an exemplary embodiment, network 111 can be a managed IP network administered by a service provider. Network 111 may be implemented in a wireless fashion, e.g., using wireless protocols and technologies, such as WiFi, WiMax, etc. Network 111 can also be a packet-switched network such as a local area network, wide area network, metropolitan area network, Internet network, or other similar type of network environment. The network 111 may be a fixed wireless network, a wireless local area network (LAN), a wireless wide area network (WAN) a personal area network (PAN), a virtual private network (VPN), intranet or other suitable network system.

If computer 100 is a PC, workstation, laptop, tablet computer and/or the like, the instructions in the memory 102 may further include a basic input output system (BIOS) (omitted for simplicity). The BIOS is a set of essential routines that initialize and test hardware at startup, start operating system 110, and support the transfer of data among the operatively connected hardware devices. The BIOS is stored in ROM 108 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

According to one or more embodiments, any one of the electronic computing device sub-components of the computer 100 includes, or may itself be, a user, issuer, verifier, revocation authority, or oblivious monitor. According to one or more embodiments, the computer system 100 as a whole may be a user, issuer, verifier, revocation authority, or oblivious monitor. Further, an anonymous credential system can include a plurality of computer systems 100, each of which can be a user, issuer, verifier, revocation authority, or oblivious monitor and which may be connected to each other through a network that can include wired or wireless communication paths along with other devices there between to facilitate signal travel and routing.

Figure 2:
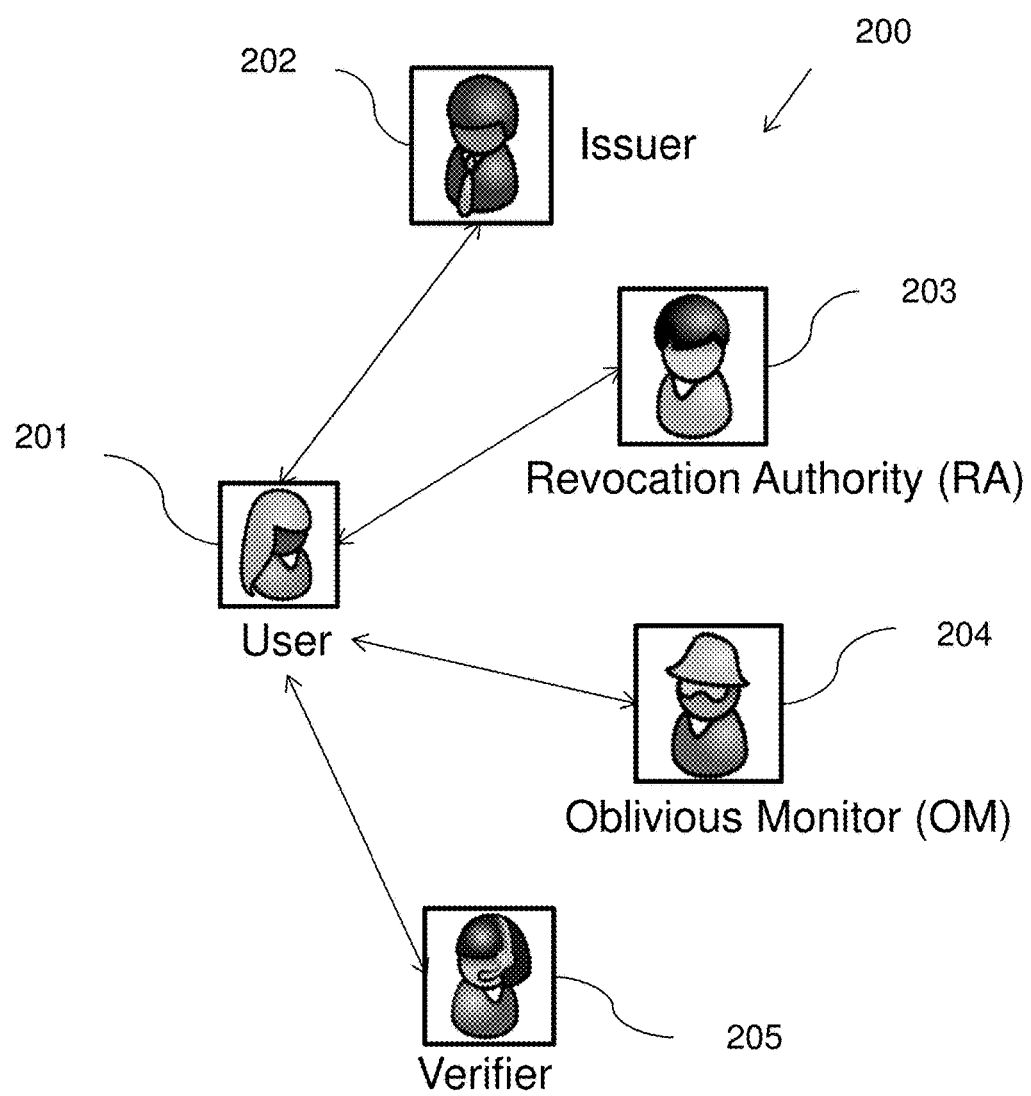
FIG. 2 depicts a diagram of an anonymous credential system for implementing some or all aspects of the system, according to some embodiments of this disclosure.

For example, turning now to FIG. 2, a diagram of an anonymous credential system 200 for implementing some or all aspects of the system is depicted, according to some embodiments of this disclosure. The anonymous credential system 200 includes a user 201 that is communicatively connected to an issuer 202, a revocation authority (RA) 203, an oblivious monitor (OM) 204, and a verifier 205. The communication paths that exist between each element provide for two way communication and can be implemented using a wired connection, a wireless connection, or a combination of both.

Figure 3A:
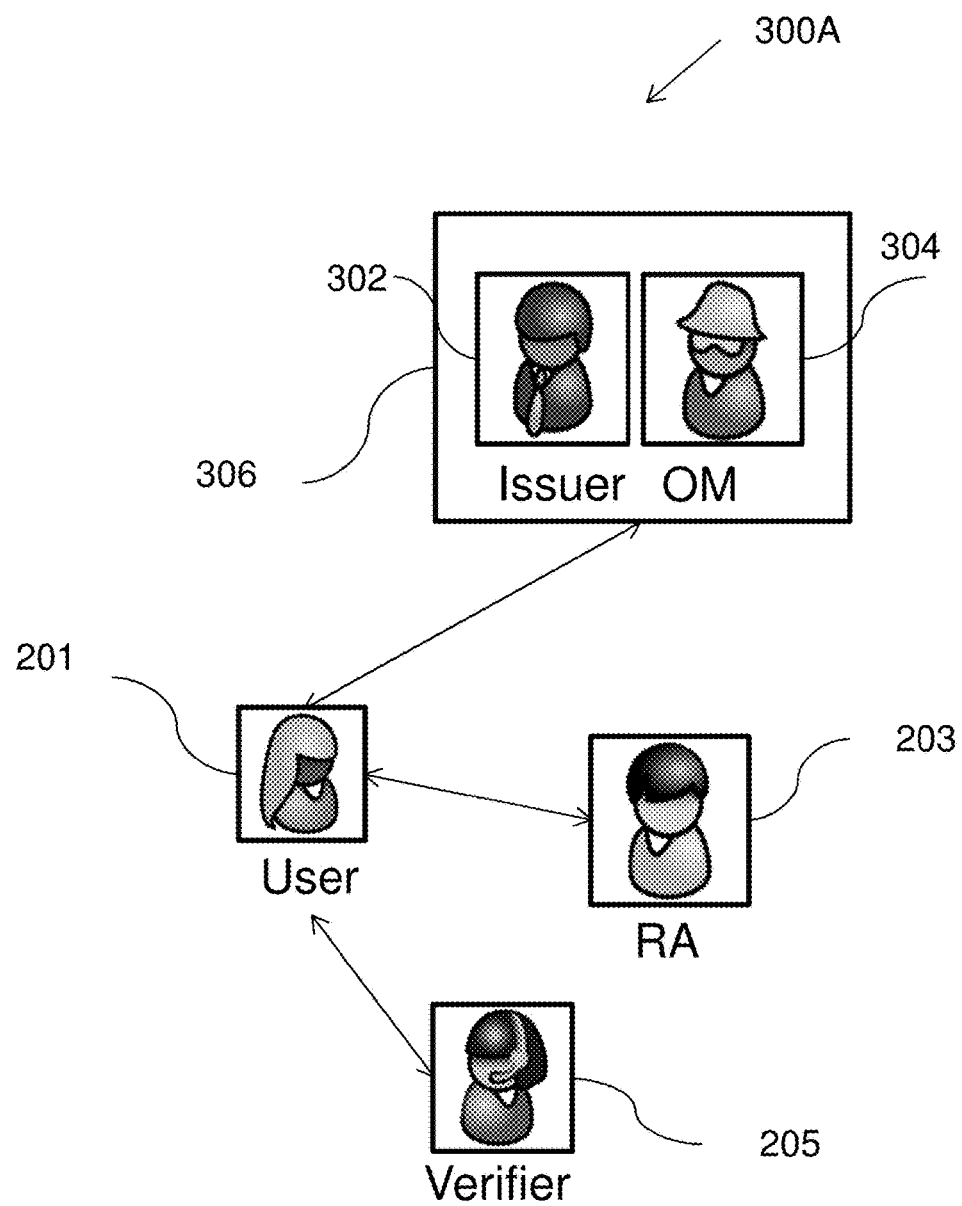
FIG. 3A depicts a diagram of an anonymous credential system wherein an issuer is shown as acting as, or including, an oblivious monitor (OM) for implementing some or all aspects of the system, according to some embodiments of this disclosure.

FIG. 3A depicts a diagram of an anonymous credential system 300A wherein an issuer 302 is shown as acting as, or including, an oblivious monitor (OM) 304 for implementing some or all aspects of the system, according to some embodiments of this disclosure. Particularly, the anonymous credential system 300A includes a combined device 306 that includes both the issuer 302 and the OM 304. This is possible because the anonymous credential system 300A and method preserves anonymity and unlinkability. The anonymous credential system 300A also includes a user 201 that can communicate with the combined device 306 for both credential acquisition and verification of a presentation token. The anonymous credential system 300A also includes an RA 203 and a verifier 205 that are communicatively connected to the user 201.

Figure 3B:
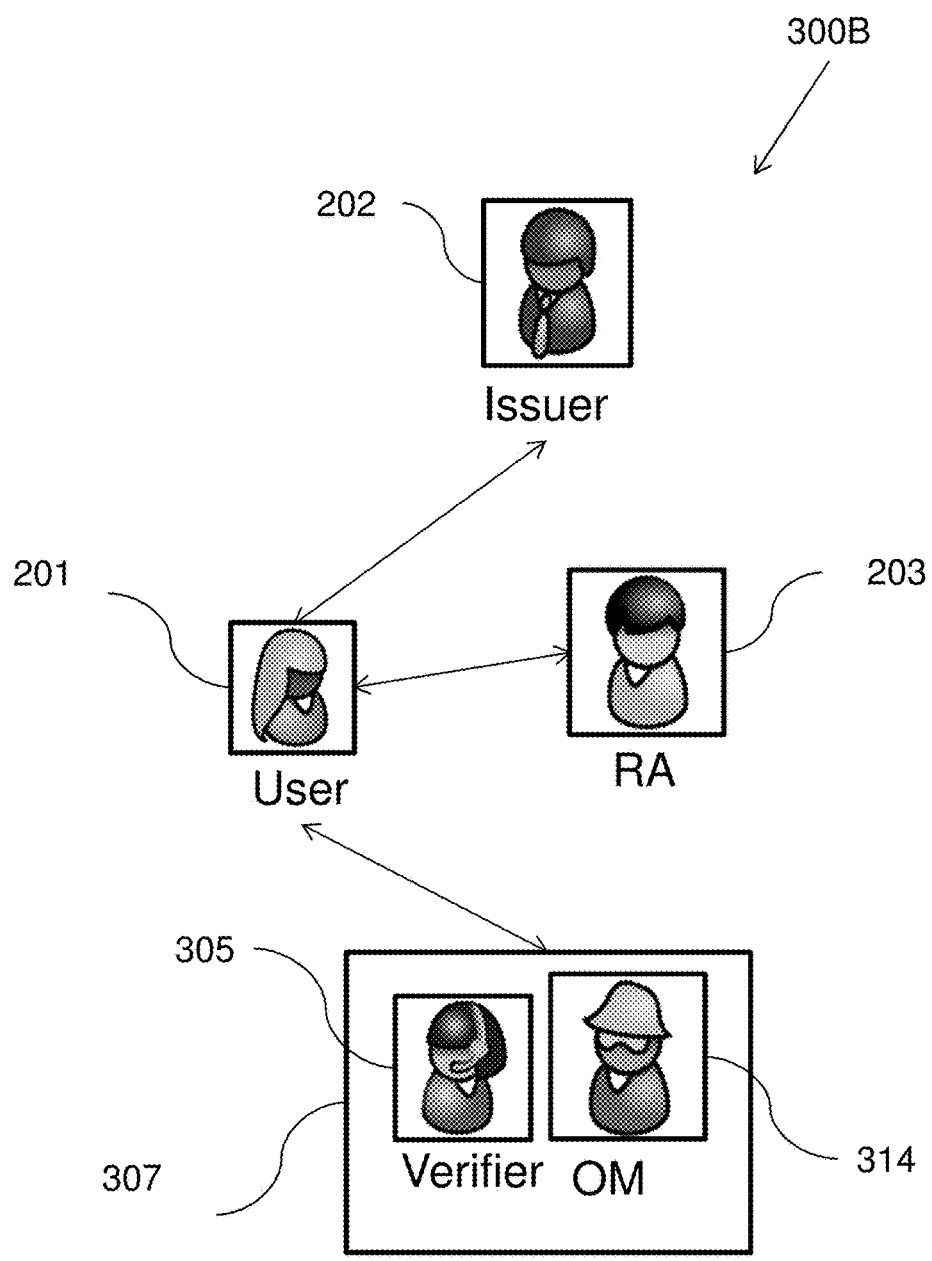
FIG. 3B depicts a diagram of an anonymous credential system wherein a verifier is shown as acting as, or including, an oblivious monitor (OM) for implementing some or all aspects of the system, according to some embodiments of this disclosure.

According to another embodiment, FIG. 3B depicts a diagram of an anonymous credential system 300B wherein a verifier 305 is shown as acting as, or including, an oblivious monitor (OM) 314 for implementing some or all aspects of the system. Particularly, the anonymous credential system 300B included a combined device 307 that includes both the verifier 305 and the OM 314. This is also possible because the anonymous credential system 300B and method preserves anonymity and unlinkability. The anonymous credential system 300B also includes a user 201 that can communicate with the combined device 307 for both verification of a presentation token and overall verification. The anonymous credential system 300B also includes an RA 203 and an issuer 202 that are communicatively connected to the user 201.

Figure 4A:
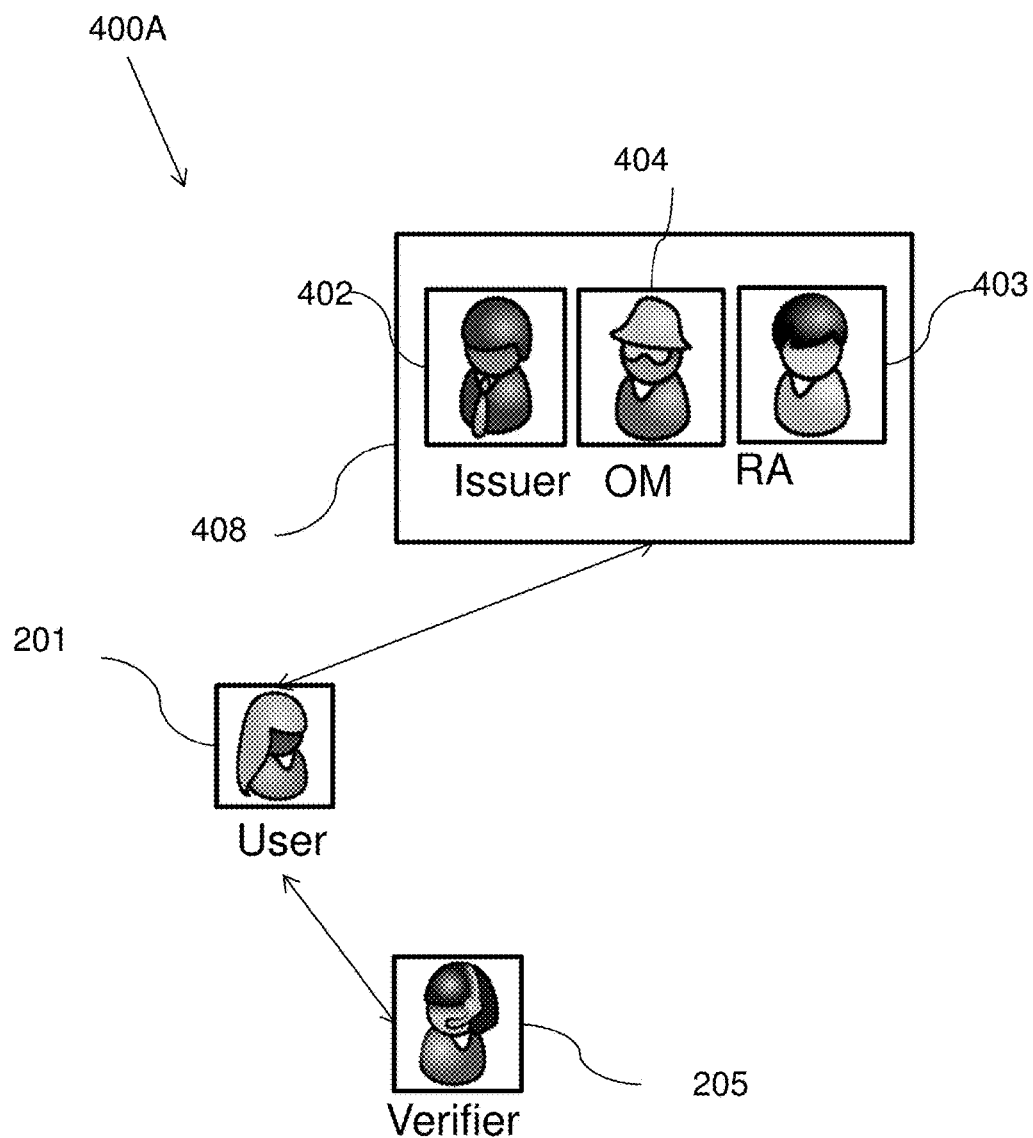
FIG. 4A depicts a diagram of an anonymous credential system wherein an issuer is shown as acting as, or including, both a revocation authority (RA) and an oblivious monitor (OM) for implementing some or all aspects of the system, according to some embodiments of this disclosure.

FIG. 4A depicts a diagram of an anonymous credential system 400A wherein an issuer 402 is shown as acting as, or including, both a revocation authority (RA) 403 and an oblivious monitor (OM) 404 for implementing some or all aspects of the system, according to some embodiments of this disclosure. Particularly, the anonymous credential system 400A includes a combined device 408 that includes the issuer 402, the OM 404, and the RA 403. Including the OM 404 is possible because the anonymous credential system 400A and method preserves anonymity and unlinkability. The inclusion of the RA 403 is possible because all revocation handles are known to the RA 403 so the issuer 402 can act as the RA 403. The anonymous credential system 400A also includes a user 201 that can communicate with the combined device 408 for credential acquisition, verification of a presentation token, and revocation handling. The anonymous credential system 400A also includes a verifier 205 that is communicatively connected to the user 201.

Figure 4B:
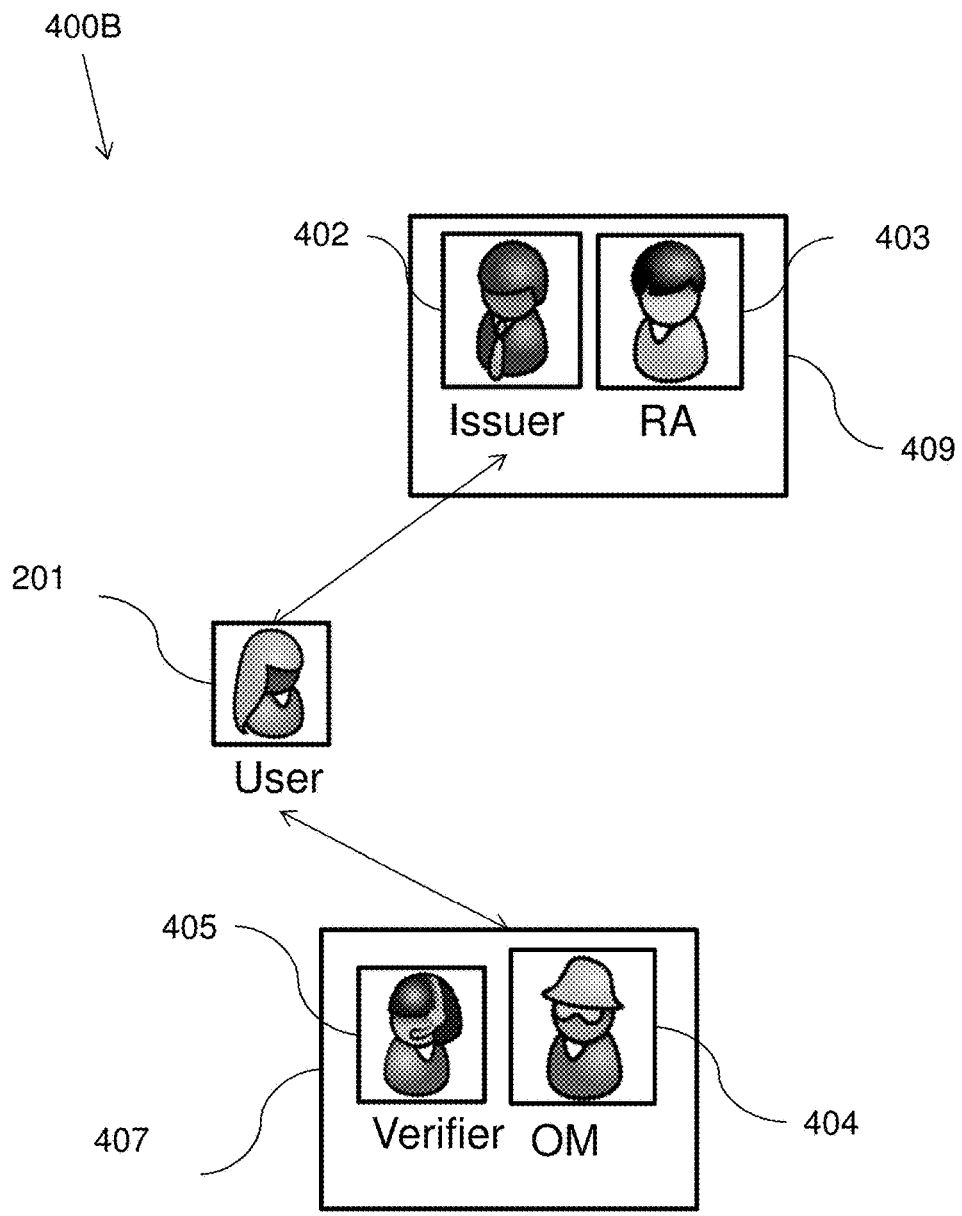
FIG. 4B depicts a diagram of an anonymous credential system wherein an issuer is shown as acting as, or including, both a revocation authority (RA) and a verifier is shown as acting as, or including, an oblivious monitor (OM) for implementing some or all aspects of the system, according to some embodiments of this disclosure.

According to another embodiment, FIG. 4B depicts a diagram of an anonymous credential system 400B wherein an issuer 402 is shown as acting as, or including, a revocation authority (RA) 403 and a verifier 405 is shown as acting as, or including, an oblivious monitor (OM) 404 for implementing some or all aspects of the system. Particularly, the anonymous credential system 400B includes a combined device 409 that includes the issuer 402 and the RA 403. The inclusion of the RA 403 is possible because all revocation handles are known to the RA 403 so the issuer 402 can act as the RA 403. The anonymous credential system 400B also includes a second combined device 407 that includes the verifier 405 and the OM 404. Including the OM 404 with the verifier 405 is possible because the anonymous credential system 400B and method preserves anonymity and unlinkability. The anonymous credential system 400B also includes a user 201 that can communicate with the combined device 409 for credential acquisition and revocation handling. The user 201 is also configured to communicate with the second combined device 407 for verification of a presentation token and overall verification.

Figure 5:
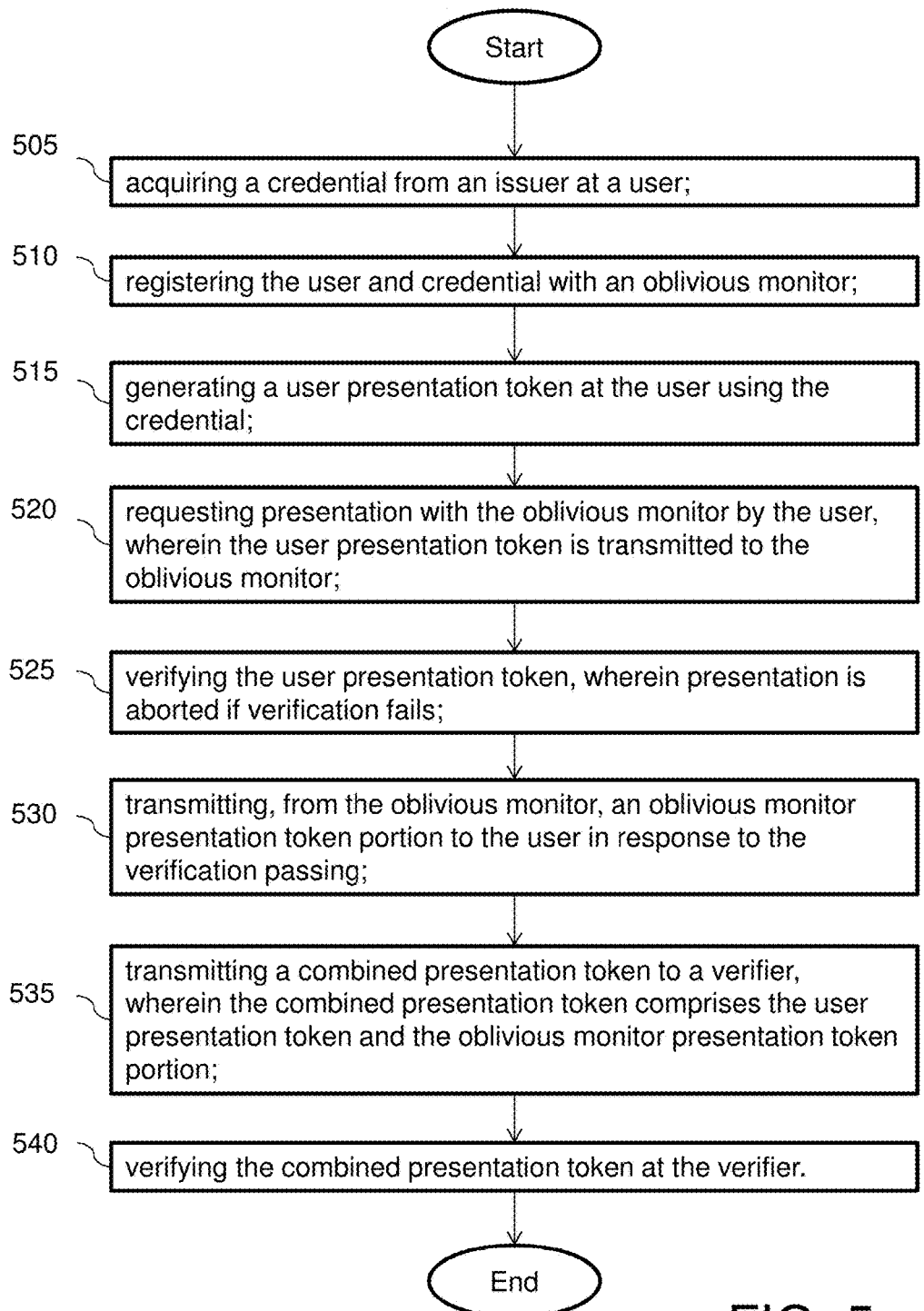
FIG. 5 depicts a process flow of an anonymous credential method in accordance with some embodiments of this disclosure.

FIG. 5 depicts a process flow of an anonymous credential method in accordance with some embodiments of this disclosure. The anonymous credential method includes acquiring a credential from an issuer at a user (operation 505). The anonymous credential method also includes registering the user and credential with an oblivious monitor (operation 510). The anonymous credential method also includes generating a user presentation token at the user using the credential (operation 515). The anonymous credential method also includes requesting presentation with the oblivious monitor by the user, wherein the user presentation token is transmitted to the oblivious monitor (operation 520). The anonymous credential method also includes verifying the user presentation token, wherein presentation is aborted if verification fails (operation 525). The anonymous credential method also includes transmitting, from the oblivious monitor, an oblivious monitor presentation token portion to the user in response to the verification passing (operation 530), and transmitting a combined presentation token to a verifier, wherein the combined presentation token comprises the user presentation token and the oblivious monitor presentation token portion (operation 535). Finally, the anonymous credential method also includes verifying the combined presentation token at the verifier (operation 540).

According to another embodiment, acquiring the credential from the issuer at the user includes generating, using the issuer, a digital certificate in the form of the credential, wherein the credential certifies user attributes, and receiving and storing, at the user, the credential in a digital wallet.

According to another embodiment, registering the user and credential with the oblivious monitor includes embedding an oblivious monitor secret key into the credential as a hidden attribute by using a corresponding public key, embedding a usage limitation value provided by the oblivious monitor into the credential, and embedding a revocation handle provided by a revocation authority (RA) into the credential.

According to another embodiment, registering the user and credential with the oblivious monitor includes generating, at the oblivious monitor, an oblivious monitor credential that is associated with the credential.

According to another embodiment, generating a user presentation token at the user using the credential includes receiving, at the user, a presentation policy from a service provider, and generating, at the user, the user presentation token using the credential and the presentation policy.

According to another embodiment, requesting presentation with the oblivious monitor by the user includes requesting from the oblivious monitor proof related to the hidden attribute.

According to another embodiment, requesting presentation with the oblivious monitor by the user includes requesting from the oblivious monitor the oblivious monitor credential associated with the credential.

According to another embodiment, verifying the combined presentation token at the verifier includes receiving, at the verifier, the combined presentation token. The received combined presentation token includes the user presentation token and the oblivious monitor presentation token portion. Further, the oblivious monitor presentation token portion is generated using at least one of an oblivious monitor credential, an oblivious monitor secret key, a usage limitation value, and a revocation handle associated with the credential. The user presentation token is generated using the credential and a presentation policy. Verifying the combined presentation token at the verifier also includes verifying, using the verifier, validity of the combined presentation token based on the presentation policy.

According to another embodiment, verifying the user presentation token includes detecting a revocation handle using the oblivious monitor, and determining, by the oblivious monitor, if the credential is revoked by determining if the revocation handle has been activated, wherein verification fails and the presentation is aborted if the revocation handle has been activated.

According to another embodiment, verifying the user presentation token includes detecting a usage limitation value using the oblivious monitor, and determining, by the oblivious monitor, if the usage limitation value has exceed a usage threshold for a time period, wherein verification fails and the presentation is aborted if the usage limitation value has exceed the usage threshold.

According to another embodiment, the computer implemented anonymous credential method can further include publishing, by the issuer, a plurality of credential types, wherein the plurality of credential types are configured to be issued, generating, by the oblivious monitor, a secret key and a corresponding public key for every one of the plurality of credential types in response to the publishing of the plurality of credential types by the issuer, presenting, by the user, the presentation using a credential type selected from the plurality of credential types, and participating, by the oblivious monitor, in the presentation that requires a certain credential type selected from the plurality of credential types, in response to the oblivious monitor solely knowing the secret key.

According to another embodiment, participating in the presentation further includes assigning a usage threshold for each credential of the plurality of credentials that defines how often such credential can be used for presenting within a certain time window by the user, and determining using the oblivious monitor if the user uses the credential above the usage threshold within the certain time window, wherein if the usage threshold is exceeded the presenting of the presentation is blocked, and wherein the oblivious monitor only knows the type of the credential used from the plurality of credential types. Additionally, according to one embodiment, the user is unlinkable with respect to both the oblivious monitor and the verifier.

According to another embodiment, the issuer can act as the oblivious monitor. According to another embodiment, the issuer can act as the revocation authority. According to another embodiment, the issuer can act as both the oblivious monitor and the revocation authority. According to another embodiment, the verifier can act as the oblivious monitor.

According to one or more embodiments, an anonymous credential system is provided where credential usage is controlled by a third party. Specifically, the third party is an oblivious monitor (OM) that restricts credential spending and prevents usage of any revoked credentials.

According to one or more embodiments, abuse prevention is provided. For example, every credential type (e.g. an ID card, a subscription voucher, etc.) is assigned a usage limitation value that shows how often such credential can be used within a certain time window by a single user. The OM obliviously participates in every presentation that a user does with a particular type of credential. If a user tries to use her credential more than it is allowed then the OM blocks the presentation. The OM does not know which exactly credential was used, just the credential type. Since mechanisms preserve anonymity and unlinkability, the issuer or the verifier themselves can act as the oblivious monitor. In this embodiment the abuse prevention is only done for the scope of a single issuer or a verifier but is not limited thereto.

According to one or more embodiments, efficient revocation is provided. Particularly, the presence of the oblivious third party also allows one to build an efficient revocation mechanism. The scheme works as follows in accordance with one or more embodiments. A so called revocation handle provided by a revocation authority (RA) is embedded as a special attribute into a credential. If a credential was stolen or needs to be revoked by any other reason, the RA or the user herself publishes her revocation handle and every time the scope changes the OM computes a list of scope-exclusive pseudonyms for the revoked revocation handles. During presentation, when talking to the OM service, a user can create a scope-exclusive pseudonym using the revocation handle from her credential and the current epoch as a scope. The OM checks if the presented pseudonym is on the list of those that correspond to the revoked credentials and aborts presentation if this is the case. Because usage limitation preserves the anonymity of the users, both the issuer and the verifier can act as an oblivious monitor. Further, because all revocation handles are known to the revocation authority, the issuer can also act as a RA.

According to one or more embodiments, different scenarios can be provided that provide solutions that support various features.

For example, according to another embodiment, embedding the OM public key is provided. The issuer publishes a list of the credential types she issues. For every credential type the oblivious monitor generates a secret and a corresponding public key:

$$x_{c1}, \ldots x_{cn} \overset{\$}{\leftarrow} Z_p; y_{ci} = g^{x_{ci}} i = 1 \ldots n;$$

$$sk_{OM} = (x_{c1}, \ldots x_{cn}); pk_{OM} = (y_{c1}, \ldots y_{cn}),$$

where $c_i$ denotes a credential type. Similar to the device and key binding for users, the OM secret key is used in every presentation that requires a certain credential type. Since only the OM knows this key, it participates in every presentation protocol. There are different embodiments to implement such approach.

For example, according to another embodiment, the secret key can be embedded into the user's credential. Particularly, when getting a new credential issued, a user can be required to blindly embed the OM secret key into her credential by using the corresponding public key $y_{ci}$ that is available to all parties in the system. To this end, the OM secret key becomes a special attribute in the user's credential that the user does not know. Therefore, to create a presentation token for her credential, the user asks the OM for the part of the proof that is related to this hidden attribute.

According to another embodiment, a separate credential from the OM can be provided. Particularly, another way of enforcing OM's participation in the presentation protocol is issuing a special OM credential during the registration with the OM service. Such credential certifies the public key of the OM that is specific to a credential type and also bound to the user secret. To limit credential usage, the verifier can require the user to present the OM credential together with the user's credential, which can be done only with the help of the OM. This solution can be more flexible and allows a verifier to choose if she wants to use the OM service or not.

According to one or more embodiments, one or more oblivious limitation mechanisms can be provided to prevent the abuse of credentials. For example, a coin related oblivious limitation mechanism can be provided. The limitation is done through the coins credentials that a user spends in a certain amount of time (for example, one hour). A coin is a credential that has a unique serial number, a validity time ("valid from" attribute), and has the same key binding as the user's credential being presented. Every time a user spends a coin by showing the credential and revealing its serial number, she is given a fresh one in exchange to the previous one. The OM first checks whether the serial number of the coin is fresh, i.e., whether it previously saw this number. If not, then the OM service verifies if the coin is currently valid. If this is the case, the user generates a fresh serial number, creates a commitment to her secret and a fresh serial number, and sends it to the OM and the latter issues a new coin that is valid in the next epoch (time window). For example, if the old coin was valid from 15:00 of the current date, the fresh coin will be valid starting 16:00 of the current date. If the user is allowed to use her credential three times per hour, then the user is issued three fresh coins. Whenever a user spends every coin he is given a fresh one in return that is valid in the next epoch (time slot).

According to another embodiment, another example of an oblivious limitation mechanism includes scope-exclusive pseudonyms. Specifically, another way to impose usage limitation is to require a scope-exclusive pseudonym based on the epoch (full hour, for example) computed from a user secret. Since in the same epoch the pseudonym value is the same, the OM service can abort if the same pseudonym is being used more than it is allowed.

Some definitions of some elements that may be used to help implement one or more of the above described embodiments are as follows:

A credential system Cred is a set of the following basic algorithms and protocols:

$$Cred \cdot Setup(1^\gamma) \overset{\$}{\to} CP$$

is a system setup algorithm that generates the common system—wide parameters CP.

$$Cred \cdot ISetup(CP) \overset{\$}{\to} (pk_I, sk_I)$$

is an issuer setup algorithm, with which the issuer generates a key pair for issuing credentials and publishes the public key $p_{KI}$.

$$Cred \cdot OMSetup : OM(CP) \overset{\$}{\to} (pk_{OM}, sk_{OM})$$

is an OM setup algorithm that takes system parameters and generates the OM secret and the corresponding public key. Cred:Register: is a protocol run between a user and the OM, where the user registers her credential with the OM service and gets the initial set of tokens for using the credential.

$$Cred - SecGEn(CP) \xrightarrow{\$} x_u$$

is a secret generating algorithm that takes the common parameters as an input and outputs a fresh user secret $x_u$.

$$Cred \cdot NymGen(CP, pk_I, x_u, scope, f_{ex}) \xrightarrow{\$} (P, aux(P))$$

is a pseudonym generating algorithm that takes a user secret as an input and creates a pseudonym P and some auxiliary information aux(P) for P. If a scope scope is specified then a pseudonym with a scope scope is generated. If the flag $f_{ex}$ is set to 1 then a scope exclusive pseudonym (that is unique for the provided scope scope) is generated.

$$Cred \cdot IssueU(CP, pk_I, pk_{OM}, x_u) \xrightarrow{\$} Cred$$

$$I(CP, sk_I, pk_{OM}, attrs, rh, c_i) \xrightarrow{\$} \in / \perp;$$

is a protocol that is run between a user and an issuer. A user takes the common parameters CP, her secret $x_u$, the public key of the issuer $pk_I$ and the oblivious monitor $pk_{OM}$, and (if revocation is enabled) a revocation handle rh, and produces a request for issuing a credential piis. An issuer takes the common parameters CP, a public key of the OM, a request for issuing a credential received from the user piis, the issuer key pair, (if revocation is enabled) a revocation handle rh, and the vector of attributes attrs assigned to the user as an input, and, if the issuance token verifies, produces a credential and sends it to the user, otherwise it outputs ⊥.

Cred:Revoke is executed by the revocation authority and the OM. The RA publishes the revocation handle rh of the revoked credential and the OM adds rh to its revocation list.

$$Cred - PresentU(CP, pk_I, pk_{OM}, x_u, Cred, cxt, [Cred_{OM}]) \xrightarrow{\$} (\pi_U, \pi_{OM});$$

$$OM(CP, sk_{OM}, pk_{OM}, pk_I, c_i, epoch, cxt, [History, RL_{epoch}]) \xrightarrow{\$} \pi_{OM};$$

$$V(CP, pk_I, pk_{OM}, cxt) \rightarrow 1/0$$

is a protocol executed between a user, the OM, and a verifier. The user takes the user secret $x_u$, a credential Cred, and a context cxt as an input and outputs her part of the presentation token $pi_U$ that proves whatever was required by the verifier, and a coin token for the OM service proving that the user is allowed to perform presentation. The OM verifies the coin token, and if the user is allowed to perform the transaction it takes a challenge ch and the user's part of the proof and generates its part of the presentation token $pi_{OM}$. The verifier then verifies a combined token.

Additionally, definitions and detailed descriptions of one or more protocols that may be used to help implement one or more of the above described embodiments are provided herewith.

According to one or more embodiments, a setup protocol may be used to help implement one or more of the above described embodiments. To set up a system all parties to the system generate their keys and then distribute their public parameters. For example, according to an embodiment, the following elements may be used to implement and define the setup protocol:

$$Cred \cdot Setup(1^\gamma) \xrightarrow{\$} CP,$$

where CP includes the hash function, which is the group that is used for scope-exclusive pseudonyms, commitment parameters (output of Com.Gen), global signature parameters, and types of the credentials.

Other examples of elements of a setup protocol include the following:

$$Cred \cdot ISetup(CP) \xrightarrow{\$} (pk_I, sk_I). \quad (pk_I, sk_I) \xleftarrow{\$} SIG \cdot KeyGen(CP).$$

$$Cred \cdot OMSetup : OM(CP) \xrightarrow{\$} (pk_{OM}, sk_{OM}) : x_{c1}, \ldots x_{cn} \xleftarrow{\$} Z_p;$$

$$y_{ci} = g^{x_{c1}}, i = 1 \ldots n; (pk, sk) \xleftarrow{\$} SIG \cdot KeyGen(CP),$$

$$sk_{OM} = (sk, x_{c1}, \ldots x_{cn}); pk_{OM} = (pk, y_{c1}, \ldots y_{cn}).$$

$$Cred \cdot SecGen : U(CP) \xrightarrow{\$} x_u : x_u \xleftarrow{\$} Z_q.$$

Further, according to one or more embodiments, an issuance protocol may be used to help implement one or more of the above described embodiments. For example, according to an embodiment, an issuance protocol that can used is depicted as follows:

$U(CP, pk_I, pk_{OM}, x_u):$      $I(CP, sh_I, pk_{OM}, attrs, rh, c_i):$ $A'_0 \leftarrow Com \cdot Commit(x_u)$ $\overline{A'_0, \pi_{is} = PK\{(x_u, r'_0) : Com \cdot Vf(x_u, r'_0, A'_0) = 1\}}$ Pick $y_{ci}$, corresponding to $c_i$;

$A''_0, r''_0 \leftarrow Sig \cdot SignC(A'_0 y_{ci}, (rh, attrs), sk_I)$ $\overleftarrow{A_0, r''_0}$ $A_0 \leftarrow Sig \cdot SIgnR(A''_0, x_u, y_{ci}, r'_0, r''_0, (rh, attrs, y_i), pk_I)$ If Sig·Verify($pk_I, A_0, x_u, y_{ci}, r_0 = r'_0 + r''_0, (rh, attrs)$) = 1

Then return Cred ← ($A_0, c_i, r_0, (rh, attrs)$)

Else return ⊥      Return ∈

As shown, to get a credential issued, the user creates a commitment to her secret and sends it to the issuer together with a proof of knowledge of the secret. The issuer verifiers the proof and if the verification is successful, it generates a credential by signing a commitment to the user's secret, corresponding public key of the oblivious monitor, a fresh revocation handle, and the user's attributes. The user verifies the validity of the signature and if it is successful, stores the newly issued credential.

According to one or more embodiments, a registration protocol may be implemented as shown herein that is used to help implement one or more of the above described embodiments. Particularly, the registration protocol that can be used is depicted as follows:

$\underline{U(CP, pk_{OM}, x_u, Cred):}$     $\underline{OM(CP, pk_z, sk_{OM}, pk_{OM}, t_i\{n_i\}):}$ $A'_0 \leftarrow Com \cdot Commit(x_u, n_i, c_i)$ $A'_0, c_i = PK \left\{ \begin{array}{l} (x_u, r'_0, n_i, rh, attrs): \\ Com \cdot Vf(x_u, n_i, r'_0, A'_0) = 1: \\ Sig \cdot Verify(pk_Z, A_0, x_u, y_{ci}, r_o, (rh, attrs)) = 1, \end{array} \right\}$ $\overleftarrow{A_0, r''_0} \quad A''_0, r''_0 \leftarrow Sig \cdot SignC(A'_0, (n_i, t_i, c_i)sk_{OM})$ $A_0 \leftarrow Sig \cdot SignR(A''_0, x_u, n_i, c_i, r'_0, r''_0, t_i, pk_{OM})$ If $Sig \cdot Verify(pk_{OM}, A_0, x_u, n_i, c_i, r_0 = r'_0 + r''_0, t_i) = 1$ Then return $Cred_{OM} \leftarrow (A_0, r_0, (n_i, t_i, c_i))$ Else return ⊥      Return ∈

As shown, the registration with an oblivious monitor is used in a case where the coins are used to control the credential usage. Particularly, as shown, to get a usage coin issued, the user creates a commitment to her secret, a fresh serial number, and a credential type and sends the commitment and the credential type to the issuer together with a proof that the user has a valid credential of the type that is bound to the same user secret.

Further, as shown, the OM verifiers the proof and if the verification is successful, the OM generates a fresh coin by signing a commitment to the user's secret, credential type, and the validity period of the coin (ti). Additionally, the user verifies the validity of the signature and if it is successful, stores the newly issued usage coin. Depending on the usage limitation for a particular credential type, the user may be issued multiple coins for the same epoch/validity period.

According to one or more embodiments, a revocation protocol may be implemented to help implement one or more of the above described embodiments. For example, in an embodiment, if credential revocation is enabled in the system, a unique number called revocation handle (rh) is embedded as an attribute in every issued credential. If a credential was stolen or needs to be revoked for any other reason, the RA or the user herself publishes her revocation handle and the OM adds it to its revocation list by running the following algorithm:

Cred.Revoke(CP,$\{rh_i\}$,epoch): Add rh of the revoked credential to the revocation list. At the beginning of a new epoch epoch, compute the following values for each revocation handle from the revocation list: NymGen(CP,$pk_{OM}$, $rh$,epoch, 1). It adds all values to the revocation list $RL_{epoch}$.

According to an embodiment, every time the epoch (scope) changes the OM computes a list of scope-exclusive pseudonyms for the revoked revocation handles.

According to one or more embodiments, a presentation protocol may be implemented as shown herein that is used to help implement one or more of the above described embodiments. The presentation protocol consists of at least two steps. The first one is a usage check protocol that is run between a user and the OM. Two embodiments can be distinguished here: when revocation is enabled, i.e., during presentation the OM checks if the credential is revoked or not; and when revocation status is not checked. According to an embodiment, the first step of a presentation protocol without revocation is shown as follows:

$\underline{U\left(\begin{array}{c} CP, pk_Z, pk_{OM}, \\ x_u, Cred_{OM}, ext \end{array}\right):}$     $\underline{OM\left(\begin{array}{c} CP, pk_Z, \\ sk_{OM}, pk_{OM}, t_{i+1} \end{array}\right):}$ $A'_0 \leftarrow Com \cdot Commit(x_u, n_{i+1})$ $ext, n_i, t_i, PK \left\{ \begin{array}{l} (x_u, r'_0, n_{i+1}): \\ Com \cdot Vf(x_u, n_{i+1}, r'_0, A'_0) = 1: \\ Sig \cdot Verify(pk_{OM}, A_0, x_u, r_0, (n_i, t_i)) = 1 \end{array} \right\}$ $A''_0, r''_0 \leftarrow Sig \cdot SignC(A'_0, (n_{i+1}, t_{i+1}, c_i), sk_{OM})$ $\overleftarrow{A_0, r''_0, \pi_{OM}(ext) = PK\{(x_{ci}): y_{ci} = g^{x_{ci}}\}}$ $A_0 \leftarrow Sign \cdot SignR(A''_0, x_u, n_{i+1}, r'_0, r''_0, t_{i+1}, pk_{OM})$ If $Sig \cdot Verify(pk_{OM}, A_0, x_u, n_{i+1}, r_0 = r'_0 + r''_0, t_{i+1}) = 1$ Then return $\pi_{OM}(ext), Cred_{OM} \leftarrow (A_0, r_0, (n_{i+1}, t_{i+1})), \pi_{OM}(ext)$ Else return ⊥      Return ∈

Here is shown how one-time coins are used to control credential usage. The user spends a coin for the current epoch that was issued to them before by revealing its serial number. To get a fresh coin for the next epoch in exchange, it also creates a commitment to a fresh serial number in a same way as was done to get the initial coin during the registration and sends it to the OM together with the context (nonce) that is used to generate the presentation proof. Further, as shown, if proof verification is successful, the Oblivious Monitor issues a fresh coin for the next epoch, generates its part of the proof using the context information (nonce) and sends everything back to the user.

According to another embodiment, the first step of a presentation protocol with revocation is shown as follows:

$\underline{U\left(\begin{array}{c} CP, pk_Z, pk_{OM}, \\ x_u, Cred, ext, epoch \end{array}\right):}$     $\underline{OM\left(\begin{array}{c} CP, sk_{OM}, pk_{OM}, pk_Z, \\ c_i, epoch, History, RL_{epoch} \end{array}\right):}$ $P_u \leftarrow NymGen(CP, pk_{OM}, x_u, epoch, 1)$ $P_{rh} \leftarrow NymGen(CP, pk_{OM}, rh, epoch, 1)$ $ext, epoch, y_{ci}, PK \left\{ \begin{array}{l} (x_u, rh, attrs): \\ NymVerify(CP, pk_{OM}, x_u, epoch) = 1\Delta; \\ NymVerify(CP, pk_{OM}, rh, epoch) = 1\Delta; \\ Sig \cdot Verify(pk_Z, A_0, x_u, y_{ci}, r_0, (eh, attrs)) = 1 \end{array} \right\}$ Check in History credential usage, i.e., if $P_u$ is used the allowed amount of times for this credential type. Check that $P_{rh}$ is not on RL. If proof fails or usage limit exceeded or credential was revoked-abort, otherwise:

$\overleftarrow{\pi_{OM}(ext) = PK\{(x_{ci}): y_{ci} = g^{x_{ci}}\}}$

Return $\pi_{OM}(ext)$      Return ∈.

As shown, another mechanism to limit credential spending—using scope-exclusive pseudonyms is provided when revocation is included. In this embodiment, instead of using one-time coins, the user generates a scope-exclusive pseudonym (a value that is unique for a pair of the scope and the user secret), where the scope is a time epoch (a time-window). She sends it to the OM together with the proof that her credential is bound to the same secret and is of a particular type. For a non-revocation proof she also creates a scope-exclusive pseudonym from the revocation handle and the epoch and proves that the revocation handle is also signed in her credential.

Further, as shown, the OM verifies the proof and checks if the revocation pseudonym is not on the revocation list created for that epoch and if the credential is not used more than it is allowed within the epoch for that credential type. If anything of the above is not true, it aborts. Otherwise, it generates its part of the proof for the context and sends it back to the user. According to an embodiment, only one of the pseudonyms may be used for the OM check in different cases. If revocation is done globally, only $P_U$ can be used for the revocation check. Also, $P_{rh}$ can be used alone without $P_U$ for the usage abuse check.

Finally, in the second part of the presentation protocol is depicted as follows:

$$\underline{U(CP, pk_Z, \text{Cred, ext}, \pi_{OM}(ext)): \quad V(CP, pk_Z, pk_{OM}, ext):}$$

Generate user's part $\pi_{OM}(ext)$ of the presentation proof for ext, Cred $$\overrightarrow{\pi_{OM}(ext), \pi_u(ext)}$$

Verify proofs and return yes/no.
Return ∈

As depicted, the user generates her part of the proof and sends it to the verifier together with a part received from the Oblivious Monitor.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, Smalltalk, C++, or the like, and conventional procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented anonymous credential method for credential abuse prevention and efficient revocation, the method comprising:
   acquiring a credential from an issuer at a user;
   registering the user and credential with an oblivious monitor;
   embedding a usage limitation value provided by the oblivious monitor into the credential;
   generating a user presentation token at the user using the credential;
   requesting presentation with the oblivious monitor by the user, wherein the user presentation token is transmitted to the oblivious monitor;
   verifying the user presentation token, wherein presentation is aborted if verification fails;
   transmitting, from the oblivious monitor, an oblivious monitor presentation token portion to the user in response to the verification passing;
   transmitting a combined presentation token to a verifier, wherein the combined presentation token comprises the user presentation token and the oblivious monitor presentation token portion; and
   verifying the combined presentation token at the verifier.

2. The computer implemented anonymous credential method from claim 1, wherein acquiring the credential from the issuer at the user comprises:
   generating, using the issuer, a digital certificate as the credential, wherein the credential certifies user attributes; and
   receiving and storing, at the user, the credential in a digital wallet.

3. The computer implemented anonymous credential method from claim 1, wherein registering the user and credential with the oblivious monitor comprises:
   embedding an oblivious monitor secret key into the credential as a hidden attribute by using a corresponding public key; and
   embedding a revocation handle provided by a revocation authority (RA) into the credential.

4. The computer implemented anonymous credential method from claim 1, wherein registering the user and credential with the oblivious monitor comprises:
   generating, at the oblivious monitor, an oblivious monitor credential that is associated with the credential.

5. The computer implemented anonymous credential method from claim 1, wherein generating a user presentation token at the user using the credential comprises:
   receiving, at the user, a presentation policy from a service provider; and
   generating, at the user, the user presentation token using the credential and the presentation policy.

6. The computer implemented anonymous credential method from claim 3, wherein requesting presentation with the oblivious monitor by the user comprises:
   requesting from the oblivious monitor proof related to the hidden attribute.

7. The computer implemented anonymous credential method from claim 4, wherein requesting presentation with the oblivious monitor by the user comprises:
   requesting from the oblivious monitor the oblivious monitor credential associated with the credential.

8. The computer implemented anonymous credential method from claim 1, wherein verifying the combined presentation token at the verifier comprises:
   receiving, at the verifier, the combined presentation token;
   wherein the received combined presentation token comprises the user presentation token and the oblivious monitor presentation token portion,
   wherein the oblivious monitor presentation token portion is generated using at least one of an oblivious monitor credential and an oblivious monitor secret key,
   wherein the oblivious monitor presentation token portion includes the usage limitation value and a revocation handle associated with the credential, and
   wherein the user presentation token is generated using the credential and a presentation policy; and
   verifying, using the verifier, validity of the combined presentation token based on the presentation policy.

9. The computer implemented anonymous credential method from claim 1, wherein verifying the user presentation token comprises:
   detecting a revocation handle using the oblivious monitor; and
   determining, by the oblivious monitor, if the revocation handle has been activated, wherein verification fails and the presentation is aborted if the revocation handle has been activated.

10. The computer implemented anonymous credential method from claim 1, wherein verifying the user presentation token comprises:
    detecting the usage limitation value using the oblivious monitor; and
    determining, by the oblivious monitor, if the usage limitation value has exceed a usage threshold for a time period, wherein verification fails and the presentation is aborted if the usage limitation value has exceed the usage threshold.

11. The computer implemented anonymous credential method from claim 1, further comprising:
    publishing, by the issuer, a plurality of credential types, wherein the plurality of credential types are configured to be issued;
    generating, by the oblivious monitor, a secret key and a corresponding public key for every one of the plurality of credential types in response to the publishing of the plurality of credential types by the issuer;
    presenting, by the user, the presentation using a credential type selected from the plurality of credential types; and
    participating, by the oblivious monitor, in the presentation that requires a certain credential type selected from the plurality of credential types, in response to the oblivious monitor solely knowing the secret key.

12. The computer implemented anonymous credential method from claim 11, wherein participating in the presentation further comprising:
    assigning a usage threshold for each credential of the plurality of credentials that defines how often such credential can be used for presenting within a certain time window by the user; and
    determining using the oblivious monitor if the user uses the credential above the usage threshold within the certain time window, wherein if the usage threshold is exceeded the presenting of the presentation is blocked, and wherein the oblivious monitor only knows the type of the credential used from the plurality of credential types.

13. The computer implemented anonymous credential method from claim 1, wherein the issuer can act as the oblivious monitor.

14. The computer implemented anonymous credential method from claim 1, wherein the issuer can act as the oblivious monitor and the revocation authority.

15. The computer implemented anonymous credential method from claim 1, wherein the verifier can act as the oblivious monitor.

16. An anonymous credential system for credential abuse prevention and efficient revocation, the system comprising:
    one or more memory devices having computer readable instructions; and
    one or more processors for executing the computer readable instructions, the computer readable instructions comprising:
    acquiring a credential from an issuer at a user;
    registering the user and credential with an oblivious monitor;
    embedding a usage limitation value provided by the oblivious monitor into the credential;
    generating a user presentation token at the user using the credential;
    requesting presentation with the oblivious monitor by the user, wherein the user presentation token is transmitted to the oblivious monitor;
    verifying the user presentation token, wherein presentation is aborted if verification fails;
    transmitting, from the oblivious monitor, an oblivious monitor presentation token portion to the user in response to the verification passing;
    transmitting a combined presentation token to a verifier, wherein the combined presentation token comprises the user presentation token and the oblivious monitor presentation token portion; and
    verifying the combined presentation token at the verifier.

17. The anonymous credential system of claim 16, wherein the user, the issuer, the verifier, the revocation authority, and the oblivious monitor are each implemented on separate computer systems.

18. The anonymous credential system of claim 16, wherein verifying the combined presentation token at the verifier comprises:
    receiving, at the verifier, the combined presentation token;
    wherein the received combined presentation token comprises the user presentation token and the oblivious monitor presentation token portion,
    wherein the oblivious monitor presentation token portion is generated using at least one of an oblivious monitor credential and an oblivious monitor secret key,
    wherein the oblivious monitor presentation token portion includes the usage limitation value and a revocation handle associated with the credential, and
    wherein the user presentation token is generated using the credential and a presentation policy; and
    verifying, using the verifier, validity of the combined presentation token based on the presentation policy.

19. The anonymous credential system of claim 16, wherein verifying the user presentation token comprises:
    detecting a revocation handle using the oblivious monitor;
    determining, by the oblivious monitor, if the revocation handle has been activated, wherein verification fails and the presentation is aborted if the revocation handle has been activated;

detecting the usage limitation value using the oblivious monitor; and determining, by the oblivious monitor, if the usage limitation value has exceed a usage threshold for a time period, wherein verification fails and the presentation is aborted if the usage limitation value has exceed the usage threshold.

20. A computer program product for credential abuse prevention and efficient revocation, the computer program product comprising a non-transitory computer readable storage medium having program instructions embodied therewith, the program instructions executable by a processor to cause the processor to:

acquire a credential from an issuer at a user;

register the user and credential with an oblivious monitor;

embed a usage limitation value provided by the oblivious monitor into the credential;

generate a user presentation token at the user using the credential;

request presentation with the oblivious monitor by the user, wherein the user presentation token is transmitted to the oblivious monitor;

verify the user presentation token, wherein presentation is aborted if verification fails;

transmit, from the oblivious monitor, an oblivious monitor presentation token portion to the user in response to the verification passing;

transmit a combined presentation token to a verifier, wherein the combined presentation token comprises the user presentation token and the oblivious monitor presentation token portion; and verify the combined presentation token at the verifier.

\* \* \* \* \*